(12) United States Patent
Liu et al.

(10) Patent No.: US 6,508,630 B2
(45) Date of Patent: Jan. 21, 2003

(54) TWISTED STATOR VANE

(75) Inventors: Hsin-Tuan Liu, West Chester, OH (US); Brent Franklin Beacher, Hamilton, OH (US); Bryan Keith Doloresco, Cincinnati, OH (US); Gregory Todd Steinmetz, Cincinnati, OH (US); Kenneth William Krabacher, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 09/822,091

(22) Filed: Mar. 30, 2001

(65) Prior Publication Data

US 2002/0141863 A1 Oct. 3, 2002

(51) Int. Cl.$^7$ ................................................. F01D 9/04
(52) U.S. Cl. ........................ 416/228; 416/235; 416/243
(58) Field of Search ................... 415/191, 192, 415/193, 208.1, 208.2, 210.1, 914, 223 A, 228, 235, 243; 416/223 A, 228, 235, 243

(56) References Cited

U.S. PATENT DOCUMENTS

| | | |
|---|---|---|
| 2,788,172 A | 4/1957 | Stalker |
| 2,830,753 A | 4/1958 | Stalker |
| 3,173,605 A | 3/1965 | Harris |
| 4,213,736 A | 7/1980 | Gongwer |
| 5,088,892 A | 2/1992 | Weingold et al. |
| 5,249,922 A | 10/1993 | Sato et al. |
| 5,342,170 A | 8/1994 | Elvekjaer et al. |
| 5,385,447 A | 1/1995 | Geister |
| 5,397,215 A | 3/1995 | Spear et al. |
| 5,482,433 A | 1/1996 | Norris et al. |
| 5,513,952 A * | 5/1996 | Mizuta et al. ........... 415/182.1 |
| 5,779,443 A | 7/1998 | Haller et al. |
| 6,079,948 A | 1/2000 | Sasaki et al. |
| 6,071,077 A | 6/2000 | Rowlands |
| 6,312,219 B1 * | 11/2001 | Wood et al. ................. 415/191 |
| 6,338,609 B1 | 1/2002 | Decker et al. |

FOREIGN PATENT DOCUMENTS

EP 0 801 230 A2 10/1997

OTHER PUBLICATIONS

Harvey et al, "Non–Axisymmetric Turbine End Wall Design: Part I Three–Dimensional Linear Design System," ASME 99–GT–337, Jun. 7–10, 1999 presentation, 9 pages.
U.S. patent application Ser. No. 09/507,408, filed Feb. 18, 2000, "Fluted Compressor Flowpath," (Docket 13DV–13303).
U.S. patent application, Ser. No. 09/507,409, filed Feb. 18, 2000, "Convex Compressor Casing," (Docket 13DV–13302).
U.S. patent application Ser. No. 09/434,344, filed Nov. 5, 1999, "Narrow Waist Vane," (Docket 13DV–13239).

* cited by examiner

*Primary Examiner*—Edward K. Look
*Assistant Examiner*—Kimya N McCoy
(74) *Attorney, Agent, or Firm*—Nathan D. Herkamp; Francis L. Conte

(57) ABSTRACT

A compressor stator includes an outer casing supporting a row of stator vanes extending radially inwardly therefrom. Each vane includes pressure and suction sides extending axially between leading and trailing edges and radially between a root and a tip. The root and tip are twisted relative to a pitch section disposed therebetween. Each vane tip is radially convex adjacent a leading edge for defining an axially concave outer flowpath in the casing for reducing peak velocity of airflow for enhanced efficiency.

20 Claims, 3 Drawing Sheets

TWISTED STATOR VANE

BACKGROUND OF THE INVENTION

The present invention relates generally to gas turbine engines, and, more specifically, to compressor stators therein.

A turbofan gas turbine engine includes in serial flow communication a fan, low and high pressure compressors, combustor, and high and low pressure turbines. Air is pressurized in the compressors and mixed with fuel in the combustor for generating hot combustion gases which flow downstream through the turbines. The high pressure turbine powers the high pressure compressor through a shaft therebetween, and the low pressure turbine powers the fan and low pressure compressor through another shaft therebetween.

The typical compressor includes many rows or stages of alternating stator vanes and rotor blades which increase the pressure of air as it flows downstream therethrough. A significant design challenge is to efficiently pressurize the air with as few compressor stages as possible. However, compressor efficiency is only one of many operating parameters for the compressor including strength and durability thereof under vibratory and centrifugal loads, and performance of the compressor over the entire flight envelope of operation with suitable stall margin.

Aerodynamic efficiency of the compressor blades and vanes is determined by the specific aerodynamic profiles thereof, as well as by the outer and inner flowpath boundaries therefor. Typical compressor design is based on two-dimensional analysis of the flowpaths therethrough, and results in relatively uniform shape of the blades and vanes in cylindrical or conical outer flowpaths.

However, actual flow of the air being compressed through the stages is not uniform over the radial span of the blades and vanes since the outer and inner flowpaths provide substantial interaction with the axially moving airflow.

Accordingly, it is desired to provide an improved compressor stator for further increasing efficiency thereof due to improvements in vane-flowpath configuration.

BRIEF SUMMARY OF THE INVENTION

A compressor stator includes an outer casing supporting a row of stator vanes extending radially inwardly therefrom. Each vane includes pressure and suction sides extending axially between leading and trailing edges and radially between a root and a tip. The root and tip are twisted relative to a pitch section disposed therebetween. Each vane tip is radially convex adjacent a leading edge for defining an axially concave outer flowpath in :the casing for reducing peak velocity of airflow for enhanced efficiency.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
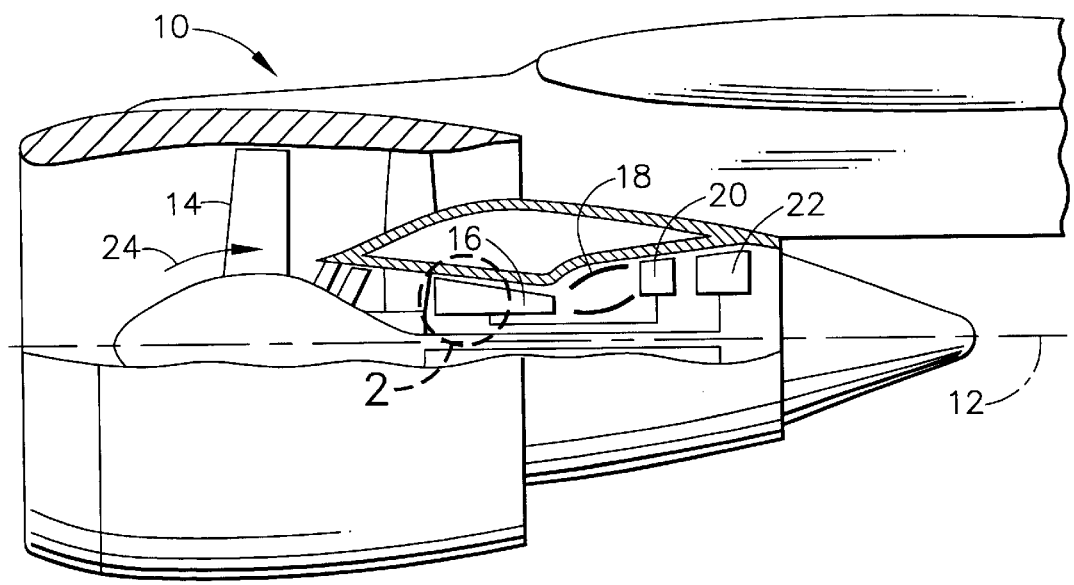
FIG. 1 is a partly sectional axial view of an exemplary turbofan gas turbine engine configured for powering an aircraft in flight.

Illustrated in FIG. 1 is an exemplary turbofan gas turbine engine 10 configured for powering an aircraft, shown in part, in flight. The engine 10 is axisymmetrical about a longitudinal or axial centerline axis 12 and includes in serial flow communication a fan 14, high pressure compressor 16, combustor 18, high pressure turbine 20 and low pressure turbine 22.

Air 24 is channeled through the engine and pressurized in the compressor 16 and mixed with fuel in the combustor 18 for generating hot combustion gases which are discharged therefrom for flow through the turbines 20,22. The high pressure turbine 20 extracts energy from the combustion gases to drive the compressor 16 through a shaft therebetween, and the low pressure turbine 22 similarly drives the fan 14 by another shaft extending therebetween.

Figure 2:
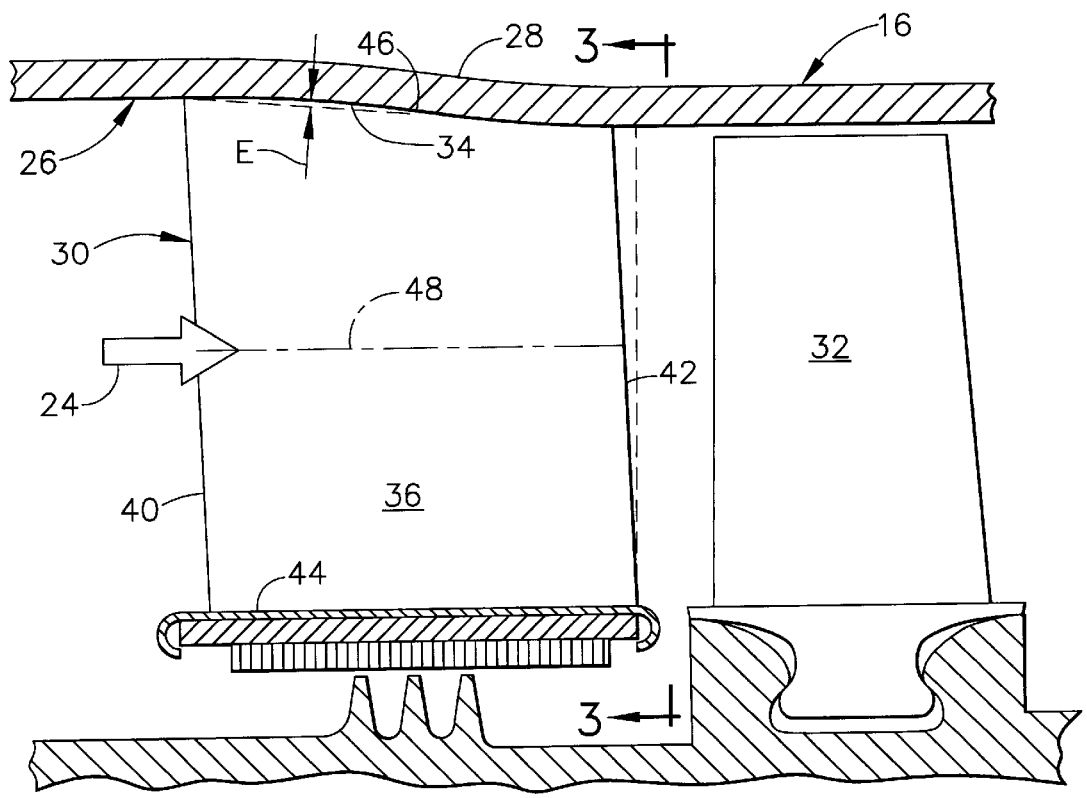
FIG. 2 is an enlarged axial sectional view through an exemplary compressor stator stage within the engine illustrated in FIG. 1 and taken within the circle labeled 2.

The compressor 16 is illustrated schematically in FIG. 1 and includes several stages for pressurizing the air in turn. FIG. 2 illustrates an exemplary stage of the compressor 16, with the succeeding stages typically decreasing in size in the axial downstream direction.

The exemplary compressor stage illustrated in FIG. 2 includes a stationary compressor stator 26 including an annular outer casing 28 supporting a row of stator vanes or airfoils 30 extending radially inwardly therefrom. The vanes 30 are specifically configured in aerodynamic profile to direct the airflow 24 downstream through cooperating compressor rotor blades 32 extending radially outwardly from a supporting rotor disk driven by the high pressure turbine.

Figure 3:
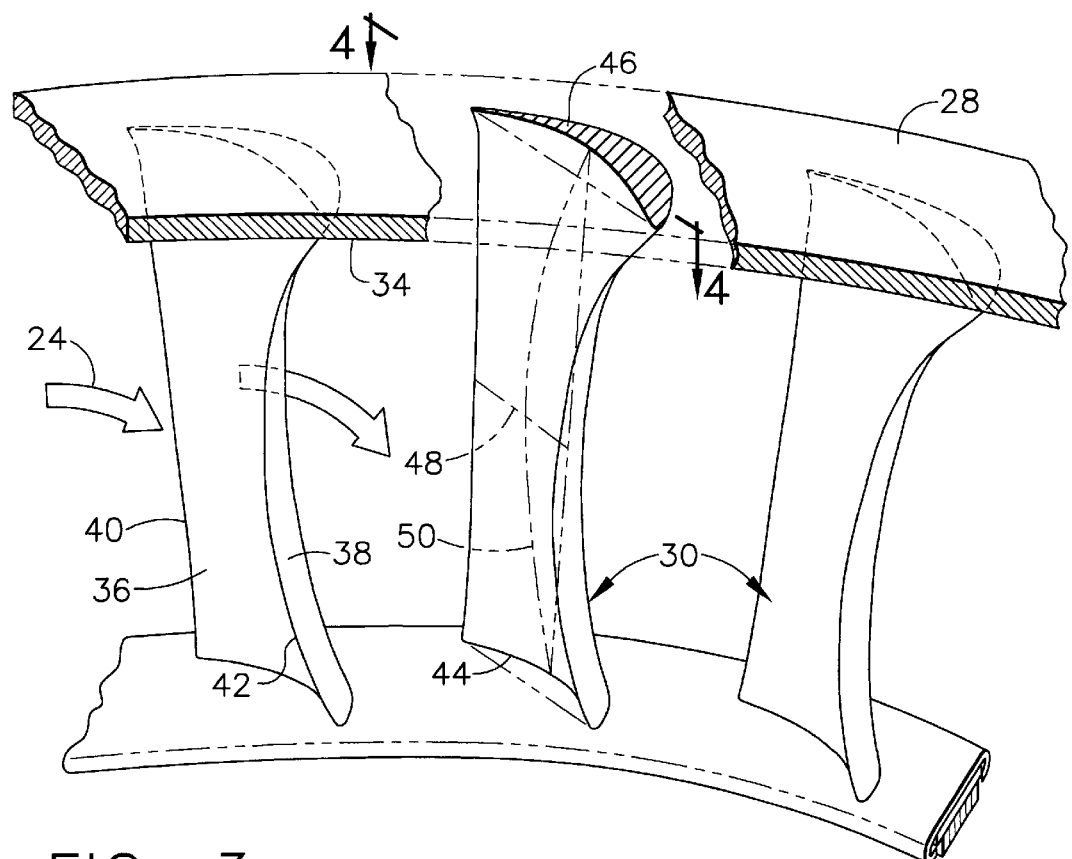
FIG. 3 is a partly sectional isometric view of a portion of the compressor stator illustrated in FIG. 2 and taken generally along line 3—3.

Referring to both FIGS. 2 and 3, the exemplary compressor stator includes a plurality of the stator vanes 30 circumferentially spaced apart from each other and extending radially inwardly from the outer casing 28 which has an inner surface defining the radially outer flowpath 34 for the airflow 24, with the radially inner flowpath being defined in any conventional manner by either a portion of the rotor disposed therebelow, or by integral inner platforms or shrouds (not shown) directly attached to the vanes.

The stator vanes 30 are identical to each other, with each vane including a generally concave pressure or first side 36 and a circumferentially opposite generally convex suction or second side 38 extending axially between leading and trailing edges 40,42 and radially along the span of the vane between a radially inner root 44 and radially outer tip 46. The root 44 is defined at the inner flowpath, and the tip 46 is defined at the outer flowpath. The vane tip 46 is suitably fixedly joined to the outer casing for supporting the entire vane thereto by being integrally cast therewith, or by having an extension brazed inside a complementary aperture through the casing.

As initially shown in FIGS. 2 and 3, each vane also includes a pitch section 48 disposed radially between the root and tip at the mid-span of the vane, with each vane being defined by the aerodynamic profile or contour of each of the radial sections of the vane from the root to the tip. A top view of an exemplary vane 30 is illustrated in more detail in FIG. 4 with the relative angular positions of the root 44, pitch section 48, and tip 46 being illustrated.

The aerodynamic profile of each vane is conventionally determined for the desired compressor stage, and includes a relatively sharp leading edge 40 increasing in thickness between the pressure and suction sides and then decreasing in thickness to the relatively sharp trailing edge 42. Each radial section of the vane has a straight chord C extending from leading to trailing edge, with the chord having a suitable angular orientation relative to the axial centerline axis of the engine for turning the airflow as required for delivery to the downstream compressor blades. The particular angular orientation of each chord is typically known as the twist or stagger angle relative to the axial centerline axis and varies from root to tip as the specific aerodynamic requirements dictate.

Figure 4:
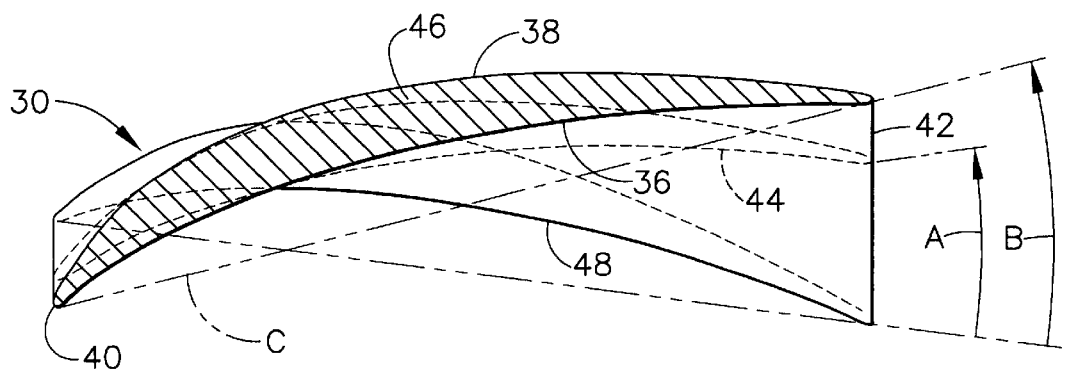
FIG. 4 is a top plan view of an exemplary one of the stator vanes illustrated in FIG. 3 and taken along line 4—4.

As illustrated in FIGS. 3 and 4, the root 44 and tip 46 are staggered or twisted relative to the pitch section 48. For example, both the root 44 and tip 46 as shown in FIG. 4 are staggered in the same counterclockwise direction from the pitch section 48, with corresponding relative stagger angles A,B relative thereto.

This specific vane configuration in cooperation with other features described hereinbelow is today possible by the use of three-dimensional aerodynamic flow analysis conventionally available in various forms. 3D flow analysis joins the more widely used 2D flow analysis for improving gas turbine engine aerodynamic design. However, 3D analysis requires more computational effort than 2D analysis and is preferably used in local flow analysis as opposed to larger scale analysis. 2D analysis may be used for aerodynamically defining one or more compressor stages and the interaction therebetween with a reasonable amount of computational effort and expense. 3D analysis may then be used for improving the local design of compressor stators over that defined by 2D analysis.

Figure 5:
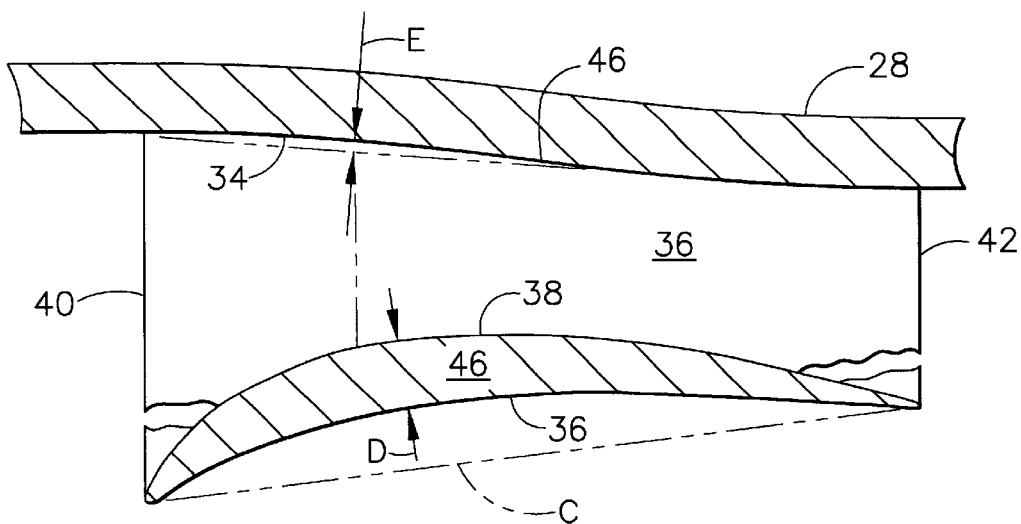
FIG. 5 is an enlarged axial sectional view of the vane tip and outer casing illustrated in FIG. 2 in combination with the radial cross section of the vane.

For example, it has been found in accordance with the present invention that stator vane performance can be substantially improved by applying 3D analysis to strengthen the low momentum weak flow regions or to eliminate flow separation near the exit of the stator vanes. In particular, FIG. 5 is an enlargement of the tip region of FIG. 2 and illustrates that the vane tip 46 is radially convex adjacent the leading edge 40 for defining a complementary axially concave outer flowpath 34 in the casing also near the vane leading edge for reducing peak velocity of the airflow along the sides of the vane.

The use of the concave outer flowpath instead of a conventional cylindrical or conical flowpath provides relief for locally high flow velocities generated by the blockage and camber effect of the individual vanes. The vane pressure side 36 is generally concave, with the vane suction side 38 being generally convex for effecting corresponding surface velocities of the airflow thereover for pressurizing the airflow in the compressor during operation. The airflow is necessarily split by the vane leading edge as it flows over the opposite pressure and suction sides, and is accelerated to a greater extent over the suction side.

However, the outer flowpath 34 confines the airflow and necessarily interacts therewith. By introducing axial concavity in the outer flowpath 34, and corresponding radial convexity along the axial profile at the vane tip 46, in the leading edge region of each vane, airfoil surface velocity may be substantially reduced for drawing more airflow toward the outer flowpath which in turn reduces flow turning and aerodynamic loading. In this way, improved efficiency of the compressor stator may be obtained by the local concave outer flowpath provided near the vane leading edges.

Since each vane has a 3D configuration, its various components affect 3D aerodynamic performance of the entire stator. In order to help balance three-dimensional flow effects and improve performance of the stator, the length of the chords C illustrated in FIG. 4 between the leading and trailing edges 40,42 increases from the pitch section 48 to preferably both the root 44 and tip 46 for positioning the trailing edge 42 substantially straight in axial side view as illustrated in FIG. 2, with that side view also being known as the meridional or axial sectional view. FIG. 4 illustrates the twist or stagger of the vane 30 from root to tip, which stagger is not viewable in the side view of FIG. 2, whereas the preferably straight trailing edge 42 is readily viewable as a projected line in FIG. 2.

For comparison, a typical stator vane having either equal chord lengths or linearly varying chord lengths from root to tip would experience a barrelled side view in FIG. 2 (not shown) if the vane were twisted or staggered. Such barrelling is eliminated in accordance with one feature of the present invention by increasing the chord length as required from root to tip corresponding to the amount of the stagger angle so that notwithstanding the root-to-tip twist of the vane the trailing edge appears straight in the side projected view of FIG. 2.

In the exemplary embodiment illustrated in FIG. 2, the length of the section chords vary as required so that the trailing edge 42 is radially straight and preferably leans axially forward from the root 44 to the tip 46. As indicated above, the straight trailing edge helps balance the three-dimensional flow effects of the twisted vane and complements the aerodynamic performance effected by the axially concave outer flowpath 34.

FIG. 5 illustrates an exemplary profile of the vane tip 46 which has a maximum circumferential thickness D disposed closer to the leading edge 40 than to the trailing edge 42. Correspondingly, the maximum radial extent or depth E of the concave outer flowpath 34, which corresponds with the extent of the convex vane tip, is preferably located upstream of the maximum thickness D of the vane tip near or at the maximum surface velocity of the airflow on the vane suction side.

The axial location of the maximum thickness D of the vane tip is near the midchord region of the vane at about 35–40% of the chord length, as measured from the leading edge, with the maximum or peak surface velocity of the airflow occurring upstream therefrom in the region of 10–25% of the chord length. By introducing the maximum depth E of the concave outer flowpath 34 in the same axial position as that of the maximum surface velocity between the vanes, that peak velocity may be substantially reduced along the outer flowpath for enhanced aerodynamic efficiency.

In the preferred embodiment, the maximum concave radial depth E of the outer flowpath 34, and correspondingly the maximum convex radial extent of the vane tip, is greater than or equal to about 1% of the axial component of the chord length at the vane tip in the axial projection illustrated in FIG. 2. This is effective for reducing airfoil surface velocity and drawing more airflow toward the outer flowpath to reduce flow turning and aerodynamic loading of the vanes.

In order to further improve radial flow distribution and aerodynamic performance, the chord length preferably increases from the pitch section 48 to both the root 44 and tip 46 for additionally positioning the leading edge 40 substantially straight in axial side view as illustrated in FIG. 2. Since the vane twists as illustrated in FIG. 4, the airfoil chords are allowed to vary in length in order to achieve the desired straight leading and trailing edges 40,42 in side view notwithstanding that twist.

In this way, the vane is not barrelled as found in conventional stator vanes of equal or linearly varying chord length, and the combined effect of straight leading and trailing edges and concave outer flowpath maximize efficiency of the stator vane by reducing peak surface velocity, reducing or eliminating flow separation, and improving any local pockets of weak aerodynamic flow.

As illustrated in FIG. 3, each of the vanes 30 preferably also includes a bowed radial stacking axis 50 from the root 44 to the pitch section 48 to the tip 46 for effecting an acute inclination angle along the pressure side 36 at preferably both the root 44 and the tip 46. Correspondingly, an obtuse inclination angle is formed along the suction side 38 at the root and the tip.

The bowed or arcuate stacking axis may be defined by the centers of gravity of the several radial sections of each vane, or in any other conventional manner such as by the stacking of the midchord points thereof. The bowed stacking axis further enhances performance of the stator vane by guiding airflow toward the outer flowpath, as well as toward the inner flowpath, and improves flow diffusion and performance.

As best illustrated in FIG. 5, the axially concave outer flowpath 34 extends downstream from the vane leading edge 40 to about the midchord region of the vane at its tip. The outer casing 28 then transitions downstream to an axially convex portion of the outer flowpath between the midchord and vane trailing edge 42. In this way, the local concave outer flowpath 34 is provided at the leading edge regions of the vanes where the airflow is being accelerated, with the convex portion of the outer flowpath extending downstream therefrom in the trailing edge regions of the vane wherein airflow diffusion occurs.

These various features described above may be used individually or in combination for improving compressor efficiency by reducing the peak surface velocity over the vanes and eliminating regions of flow separation or pockets of 9l weak airflow. This design may also result in improvements in stall margin.

Figure 6:
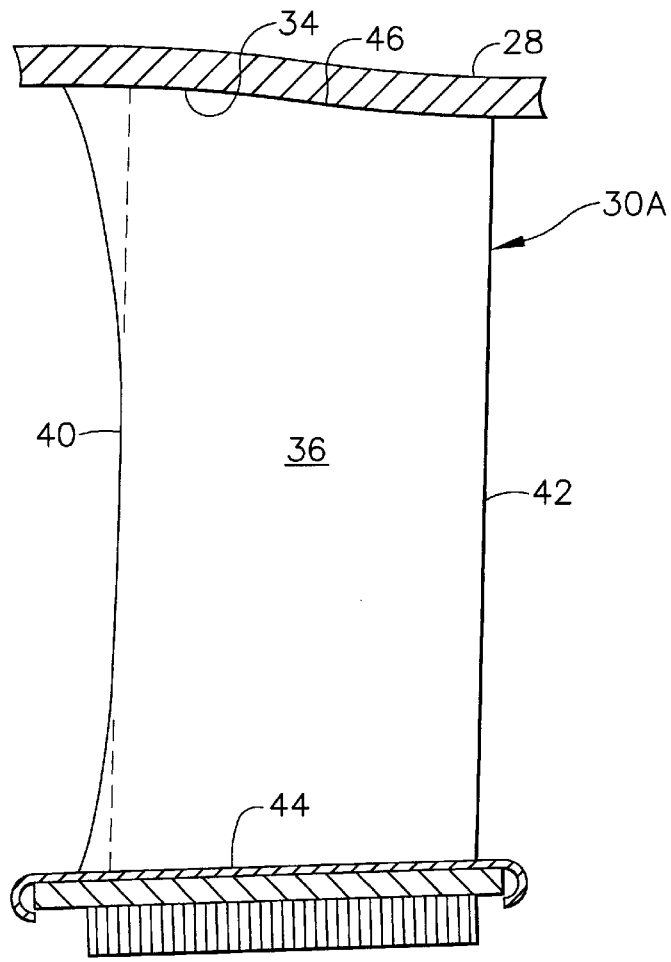
FIG. 6 is a side elevational view, like FIG. 2, of the compressor stator vane and surrounding casing in accordance with another embodiment of the present invention.

Illustrated in FIG. 6 is an alternate embodiment of the compressor stator in which the vanes, designated 30A, are slightly modified from those illustrated in FIGS. 2–5. In FIG. 6, the chords vary in length for positioning the trailing edge 42 radially straight without axial lean either forward or aft.

And, the chord lengths also vary for sweeping forward the leading edge 40 from the pitch section radially outwardly to both the root 44 and tip 46. Significantly larger airfoil chords are required near the root and tip of the vane for effecting the forward sweep of the leading edge with corresponding improvement in aerodynamic performance attributable to that sweep notwithstanding the twist of the vane, like that of FIG. 4.

The embodiment of the invention illustrated in FIGS. 2–5 was built and tested in a complete development engine. Test results support the elimination of flow separation as predicted by 3D aerodynamic analysis. And, significant improvements in compressor efficiency and operability margin were demonstrated.

The features of the above described invention may be used in various forms of axial flow compressor stators including low pressure compressors or boosters, as well as the high pressure compressor application disclosed above. The locally concave outer flowpath feature may also be introduced in the radially inner flowpath where practical for corresponding improvement in performance.

The compressor stator may be manufactured in any conventional manner such as integrally casting the vanes and outer casing. Or, the vanes may be individually fabricated by casting, forging, or machining, and joined to the casing by brazing.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A compressor stator vane comprising:
   pressures and suction sides extending axially between leading and trailing edges and radially between a root and a tip;
   a pitch section disposed radially between said root and tip, with said root and tip being twisted relative to said pitch section; and
   said tip being radially convex adjacent said leading edge for reducing peak velocity of airflow along said sides thereof.

2. A vane according to claim 1 wherein chord length between said leading and trailing edges increases from said pitch section to said root and tip for positioning said trailing edge substantially straight in axial side view.

3. A vane according to claim 2 wherein said trailing edge extends radially straight without axial lean.

4. A vane according to claim 2 wherein said trailing edge leans axially forward from said root to said tip.

5. A vane according to claim 2 wherein said tip has a maximum thickness disposed closer to said leading edge than to said trailing edge, and radial extent of said convex tip is maximum upstream from said maximum thickness.

6. A vane according to claim 5 wherein said maximum convex radial extent is greater than about 1% of the axial projection of said chord length at said tip.

7. A vane according to claim 2 wherein said chord length increases from said pitch section to said root and tip for positioning said leading edge substantially straight in axial side view.

8. A vane according to claim 2 wherein said chord length increases from said pitch section to said root and tip for sweeping forward said leading edge from said pitch section.

9. A vane according to claim 2 further comprising a bowed stacking axis from said root to said pitch section to said tip for effecting acute inclination angles along said pressure side at said root and tip.

10. A vane according to claim 2 further comprising an arcuate outer casing fixedly joined to said vane tip for defining an axially concave outer flowpath near said vane leading edge being complementary with said radially convex vane tip.

11. A vane according to claim 10 wherein said outer casing transitions downstream to an axially convex outer flowpath near said vane trailing edge.

12. A compressor stator comprising:

an annular outer casing;

a row of stator vanes extending radially inwardly from said casing, and each of said vanes including:

pressure and suction sides extending axially between leading and trailing edges and radially between a root and a tip;

a pitch section disposed radially between said root and tip, with said root and tip being twisted relative to said pitch section; and said tip being radially convex adjacent said leading edge for defining an axially concave outer flowpath in said casing near said vane leading edge for reducing peak velocity of airflow along said vane sides.

13. A stator according to claim 12 wherein chord length between said leading and trailing edges of said vanes increases from said pitch section to said root and tip for positioning said trailing edge substantially straight in axial side view.

14. A stator according to claim 13 wherein said vane trailing edges extend radially straight without axial lean.

15. A stator according to claim 13 wherein said vane trailing edges lean axially forward from said roots to tips.

16. A stator according to claim 13 wherein each of said vane tips has a maximum thickness disposed closer to said leading edges than to said trailing edges, and radial depth of said concave flowpath is maximum upstream from said maximum vane thickness.

17. A stator according to claim 16 wherein said maximum concave radial depth is greater than about 1% of the axial projection of said chord length at said vane tips.

18. A stator according to claim 17 wherein said chord length increases from said pitch sections to said roots and tips for sweeping forward said leading edges from said pitch sections.

19. A stator according to claim 17 wherein said chord length increases from said pitch sections to said roots and tips for positioning said leading edges substantially straight in axial side view.

20. A stator according to claim 19 wherein each of said vanes further includes a bowed stacking axis from said root to said pitch section to said tip for effecting acute inclination angles along said pressure side at said root and tip.

* * * * *